United States Patent
Zaier

(10) Patent No.: US 7,937,185 B2
(45) Date of Patent: May 3, 2011

(54) STABLE MOTION CONTROL SYSTEM AND METHOD FOR A LEGGED MOBILE ROBOT

(75) Inventor: Riadh Zaier, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 11/375,144

(22) Filed: Mar. 15, 2006

(65) Prior Publication Data

US 2007/0150095 A1 Jun. 28, 2007

(30) Foreign Application Priority Data

Dec. 27, 2005 (JP) .................................. 2005-376460

(51) Int. Cl.
*B25J 13/00* (2006.01)
*G06F 19/00* (2011.01)
*B25J 5/00* (2006.01)
*B25J 13/08* (2006.01)

(52) U.S. Cl. ........ 700/245; 700/249; 700/250; 700/253; 700/260

(58) Field of Classification Search .................. 180/8.1, 180/8.5, 8.6; 318/568, 590–591, 630, 636, 318/646; 700/29, 48, 54, 61–64, 67, 69, 700/71, 73, 245, 253, 254
See application file for complete search history.

(56) References Cited

U.S. PATENT DOCUMENTS

| | | | | |
|---|---|---|---|---|
| 5,221,883 A | * | 6/1993 | Takenaka et al. | 318/568.12 |
| 5,343,397 A | * | 8/1994 | Yoshino et al. | 701/23 |
| 6,064,167 A | * | 5/2000 | Takenaka et al. | 318/568.12 |
| 6,289,265 B1 | * | 9/2001 | Takenaka et al. | 700/245 |
| 6,556,892 B2 | * | 4/2003 | Kuroki et al. | 700/245 |
| 6,567,724 B2 | * | 5/2003 | Yamamoto | 700/261 |
| 6,697,711 B2 | * | 2/2004 | Yokono et al. | 700/245 |
| 6,754,560 B2 | * | 6/2004 | Fujita et al. | 700/245 |
| 6,802,382 B2 | * | 10/2004 | Hattori et al. | 180/8.6 |
| 6,876,903 B2 | * | 4/2005 | Takenaka | 700/245 |
| 6,969,965 B2 | * | 11/2005 | Takenaka et al. | 318/568.12 |
| 7,024,276 B2 | * | 4/2006 | Ito | 700/245 |
| 7,386,364 B2 | * | 6/2008 | Mikami et al. | 700/245 |
| 7,482,775 B2 | * | 1/2009 | Zaier | 318/568.12 |
| 2006/0247799 A1 | * | 11/2006 | Takenaka et al. | 700/54 |

FOREIGN PATENT DOCUMENTS

| | | |
|---|---|---|
| JP | 2004-330361 A | 11/2004 |
| JP | 2005-034984 A | 2/2005 |
| JP | 2005-96068 | 4/2005 |

OTHER PUBLICATIONS

Japanese Notice of Rejection, Partial English-language translation, mailed Jan. 11, 2011 for corresponding Japanese Application No. 2005-376460.

* cited by examiner

*Primary Examiner* — Khoi Tran
*Assistant Examiner* — Dale Moyer
(74) *Attorney, Agent, or Firm* — Fujitsu Limited Center

(57) ABSTRACT

The motion of a robot is switched from a first motion, which the robot is currently performing, to a second motion. Postures of the robot in both the motions are pre-defined with a plurality of frames at a plurality of different time points. When switching from the first motion to the second motion, information is acquired on the frames corresponding to the second motion, and the posture of the robot is after the switching is controlled based on the acquired information.

6 Claims, 17 Drawing Sheets

FIG.2
KICKING MOTION
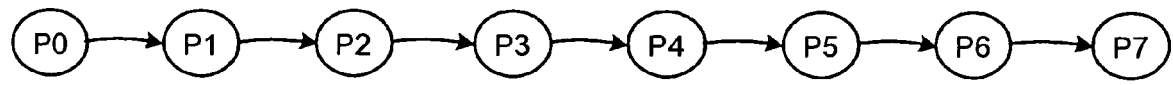
WALKING MOTION
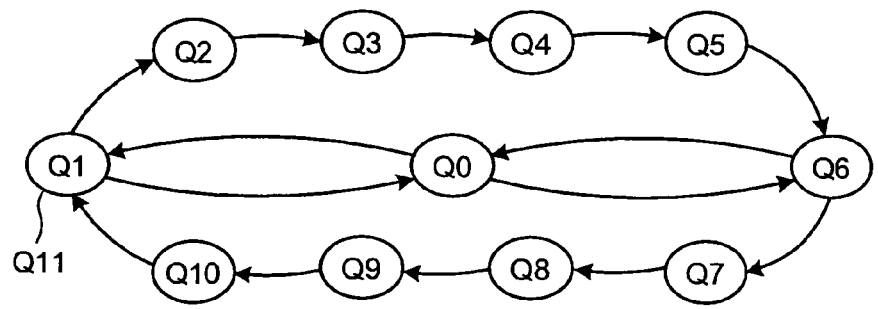

FIG.4
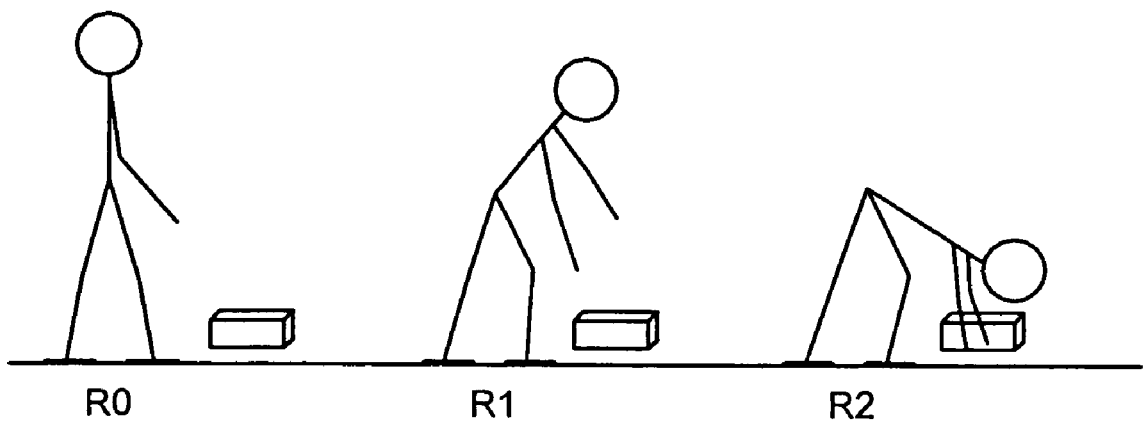

FIG. 13
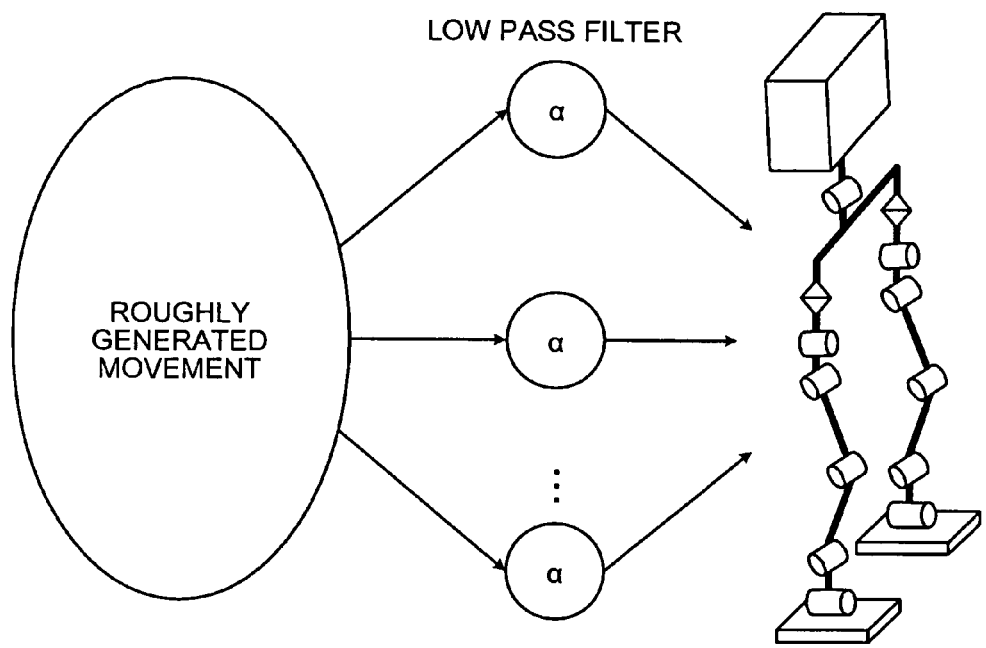
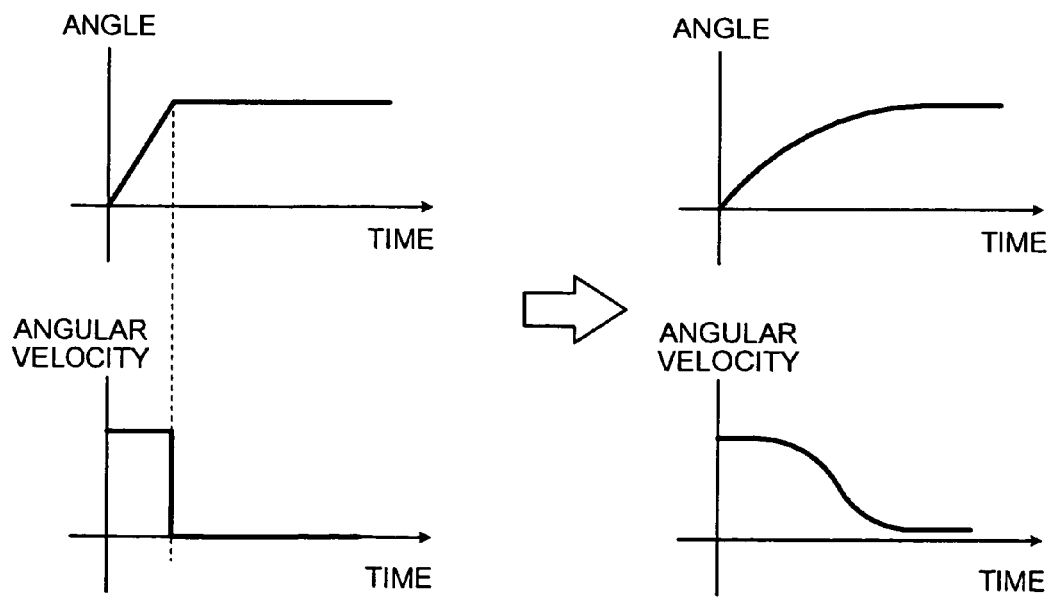

FIG.14
STRIDE
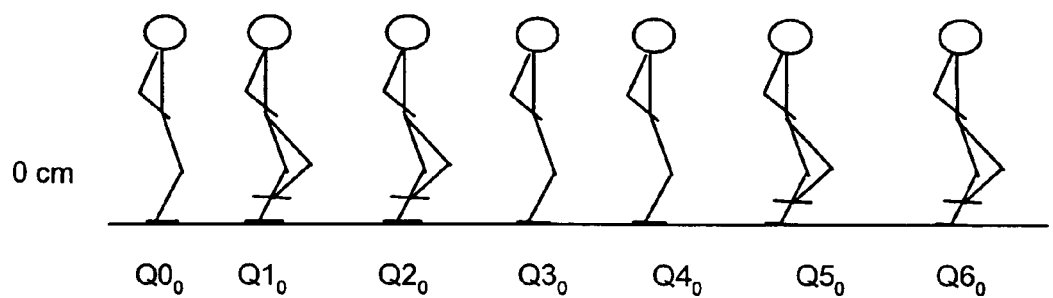
0 cm    $Q0_0$   $Q1_0$   $Q2_0$   $Q3_0$   $Q4_0$   $Q5_0$   $Q6_0$
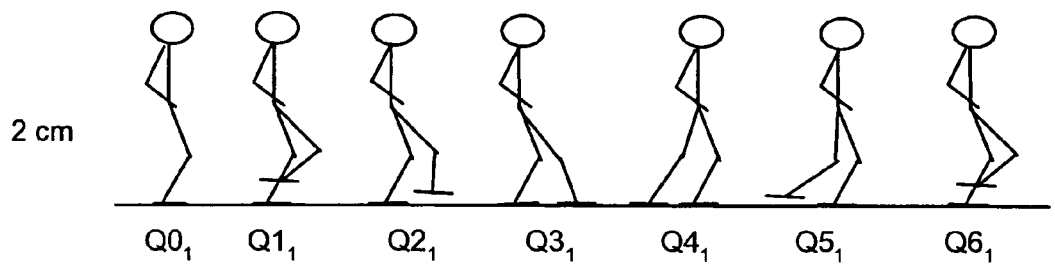
2 cm    $Q0_1$   $Q1_1$   $Q2_1$   $Q3_1$   $Q4_1$   $Q5_1$   $Q6_1$

STABLE MOTION CONTROL SYSTEM AND METHOD FOR A LEGGED MOBILE ROBOT

BACKGROUND OF THE INVENTION

1. Field of the Invention

The present invention relates to a robot controller for controlling motions of a robot.

2. Description of the Related Art

Recently, humanoid robots, particularly walking of humanoid robots, are attracting attentions of the researchers. Most of the studies relating to walking of the humanoid robots use the ZMP (Zero Moment Point) criteria. The ZMP criteria include a control to retain the ZMP within a support polygon. Specifically, this approach includes modeling the humanoid robot and the environment around the robot, and solving a differential equation. However, accurate modeling becomes difficult if there are unknowns. Furthermore, a real time control becomes difficult because time is taken in solving the differential equation.

One approach is to use a method that does not employ the ZMP criteria at all. There have been known techniques, for example, that make use of a cyclic movement of a movable section of a robot, and adjust a phase of the cyclic movement so as to stabilize posture of the robot (See Japanese Patent Laid-Open Publication No. 2005-96068). The movable section can be a leg or an arm of a robot.

However, humanoid robots can perform various motions and switch from one motion to another. For example, a humanoid robot can switch from kicking motion to walking motion. When the humanoid robot switches motions, its cyclic movement is effected and may severely deviate from a true cyclic movement and make the posture of the humanoid robot unstable.

There is a need to develop a technique enabling switching between various motions without making a humanoid robot unstable.

SUMMARY OF THE INVENTION

It is an object of the present invention to at least solve the problems in the conventional technology.

According to an aspect of the present invention, a robot controller that controls motions of a robot when switching motion of the robot from a first motion, which the robot is currently performing, to a second motion, includes a posture information acquiring unit that acquires second posture information indicative of a plurality of postures of the robot in the second motion at respectively time points; and a motion control unit that controls switching of the motion of the robot from the first motion to the second motion based on the second posture information.

According to another aspect of the present invention, a method of controlling motions of a robot when switching motion of the robot from a first motion, which the robot is currently performing, to a second motion, includes a posture information acquiring step of acquiring second posture information indicative of a plurality of postures of the robot in the second motion at respectively time points; and a motion controlling step of controlling switching of the motion of the robot from the first motion to the second motion based on the second posture information.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a state transition graph of each frame in a kicking motion and in a walking motion;

FIG. 4 is a schematic of a robot that lifts up a load;

FIG. 13 is a schematic illustrating an action of a neuron having a prespecified time delay constant;

FIG. 14 is a schematic for explaining control processing of a posture when the robot performs a walking motion;

DETAILED DESCRIPTION OF THE PREFERRED EMBODIMENTS

Exemplary embodiments of the present invention are described in detail below with reference to the accompanying drawings. A two-legged humanoid robot is described below as an example; however, the present invention can be applied to other robot, such as a four-legged robot.

Figure 1:
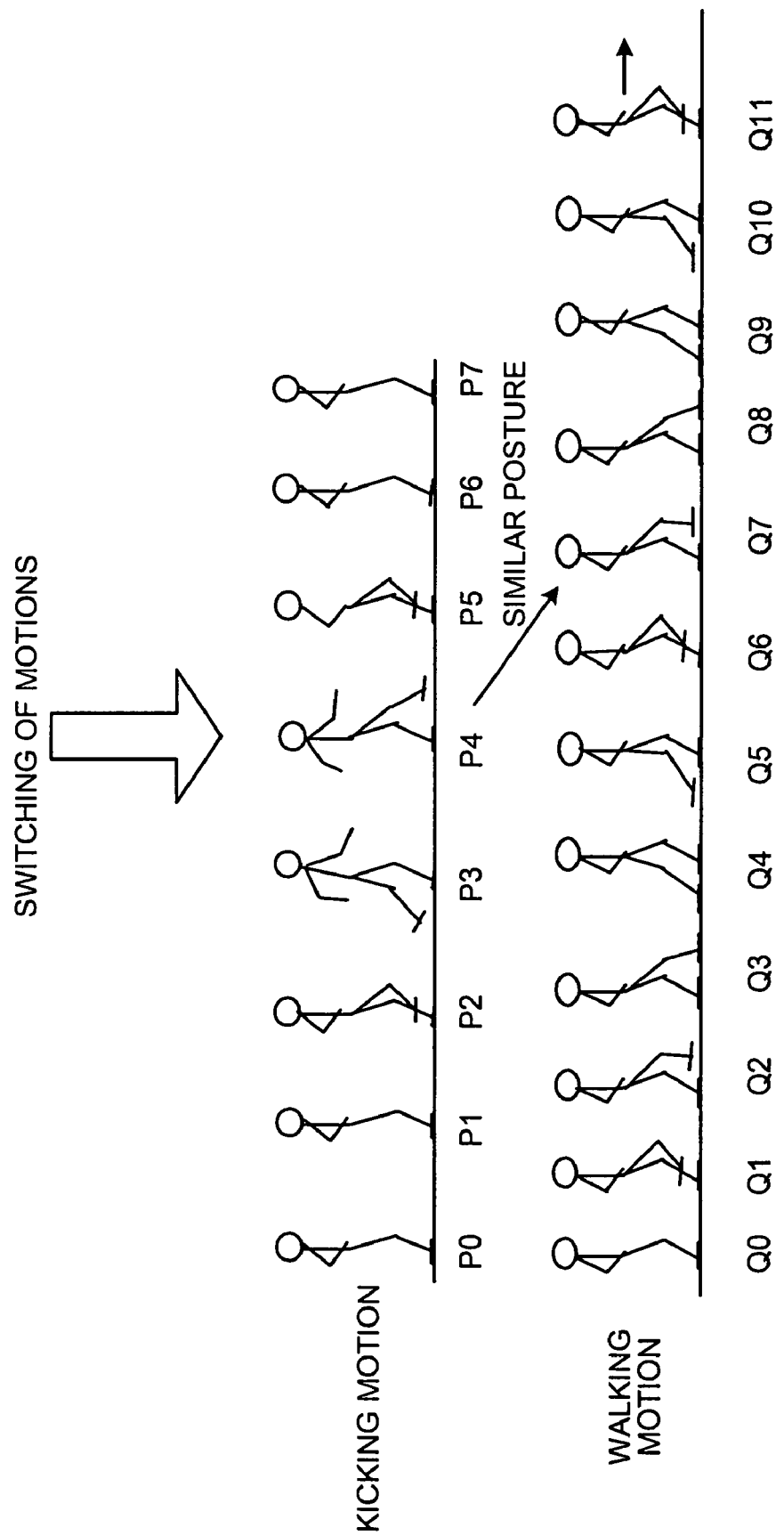
FIG. 1 is a schematic for explaining a concept of the present invention.

FIG. 1 is a schematic for explaining a concept of the present invention. In FIG. 1, a case in which motions of a robot is switched from a kicking motion to a walking motion is described as an example, however, the motions are not limited to these motions.

A plurality of frames is previously set for each motion that define various postures during the motion. Precisely, the frames define the parameters such as the angles of the joints of the robot.

In the example of FIG. 1, eight frame P0 to P7 are set for the kicking motion, and twelve frames Q0 to q11 are set for the walking motion. However, the number of frames is optional. The frame P0 corresponds to a posture of a robot in which the robot is standing still just before starting the kicking motion. The frame P7 corresponds to a posture of the robot in which the robot is standing still after completing the kicking motion.

The frame Q0 corresponding to a posture of the robot in which the robot is standing still just before starting the walking motion.

In the case of the motions of the robot, such as a walking motion, in which a sequence of postures is repeated, some frames out of the frames Q0 to Q11 are set such that a posture of the robot in those frames is such that the robot can stand still without falling and without performing any motion.

In the walking motion, for instance, the posture described above corresponds to those in the frames Q1, Q6 and Q11. The state of the robot is the frames Q1 and Q11 is the same. In other words, in the frames Q1 and Q11, the linear speed of the robot is zero, the robot stands only on the right leg, and the stride is zero. Zero-stride means that both the legs of the robot are aligned. In the frame Q6, the linear speed of the robot is zero, the robot stands only on the left leg, and the stride is zero. In the frames Q1, Q6 and Q11 the robot is standing alone and the stride is zero; therefore, these frames will be referred to as reference frames. Postures of the robot are controlled by setting the reference frames Q1, Q6 and Q11 and making the robot take the postures in the reference frames Q1, Q6 and Q11, thereby the postures can be recovered even when the postures run into an unstable state.

Switching of postures in between the frames P0 to P7 and Q0 to Q11 is performed by interpolating postures in between the frames. Postures corresponding to frames other than the reference frames are only roughly defined, and the postures are corrected from time to time so that the robot can walk stably.

FIG. 2 is a state transition graph of the frames P0 to P7 corresponding to the kicking motion and the frames Q0 to Q11 corresponding to the walking motion. In the kicking motion, the state from the frame P0 to the frame P7 shifts in one direction. On the other hand, in the walking motion, the state can shift from the frame Q0 to the reference frame Q1 (which is same as the reference frame Q11) or the reference frame Q6. The state can also shift from the reference frame Q1 or the reference frame Q6 to the reference frame Q0.

In the example shown in FIG. 1, the state at first shifts from the frame Q0 to the reference frame Q1. Then the state sequentially shifts from the reference frame Q1 to the reference frame Q11.

In FIG. 1, when a motion of the robot is switched to another, the posture most similar to that at the time point of the switching is selected among those defining motions after the switching.

FIG. 1 shows a case in which, when a posture of the robot is that of the kicking motion in the frame P4, the motion is switched from the kicking motion to a walking motion. In this case, a frame of a walking motion, which is the posture most similar to that in the frame 4, is searched. In this example, it is assumed that the frame Q7 is searched.

Then, an amount of correction for the posture in frame P4 is calculated from the difference between the posture in frame Q7 and a posture in frame Q8, which is the frame subsequent to the frame Q7. Switching of the motion from the kicking motion to the walking motion is performed based on the calculated amount of correction and the posture in the frame P4.

Figure 3:
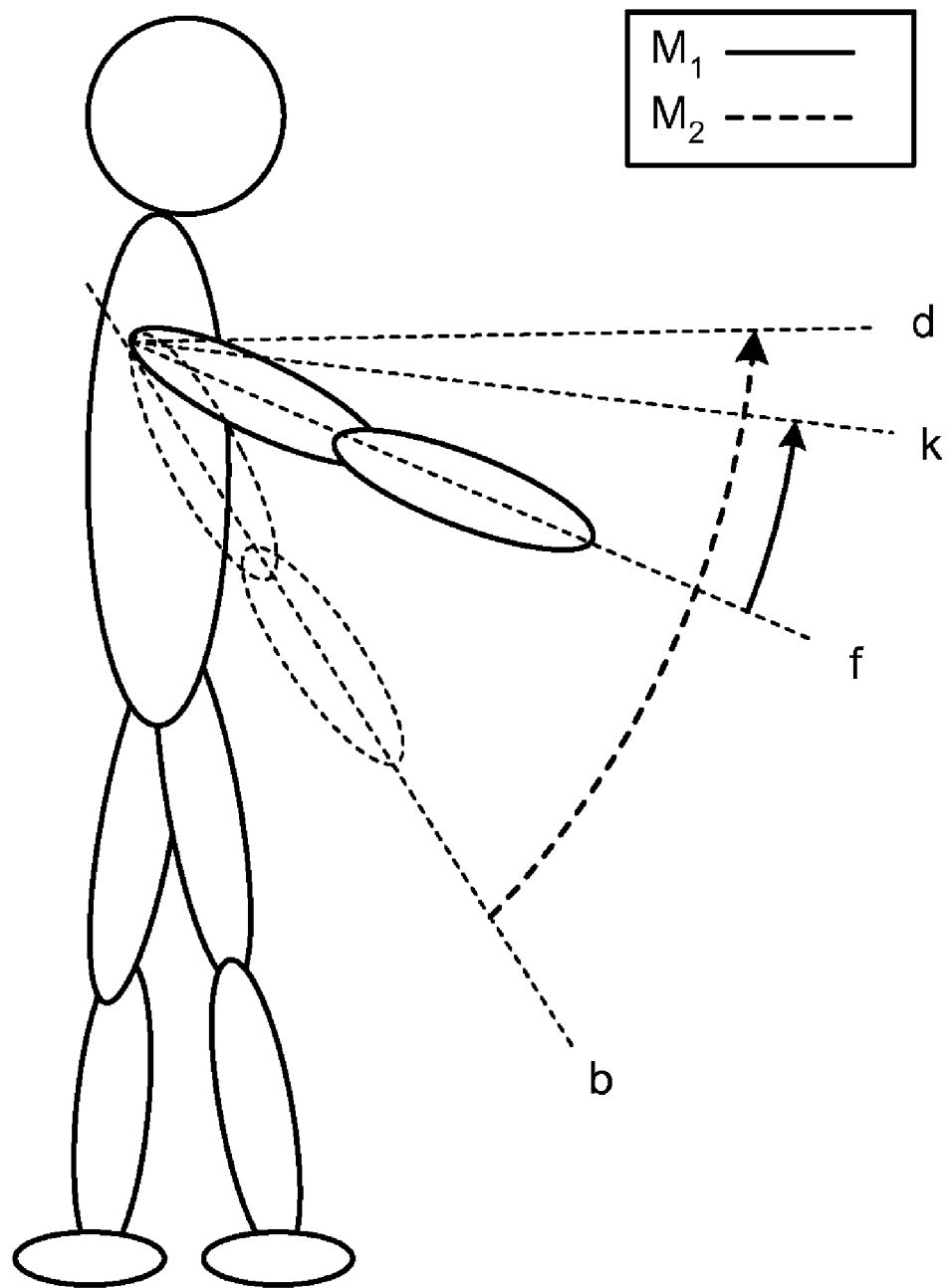
FIG. 3 is a schematic for explaining processing of computing an amount of correction of a posture of the robot.

FIG. 3 is a schematic for explaining a processing for computing the amount of correction. Attention has been focused only on motions of the arms of the robot to simplify descriptions. Moreover, it is assumed that the motions are switched from a motion $M_1$ to a motion $M_2$.

A posture f corresponds to a posture of the robot in which the motions of the robot are to be switched while the robot is performing the motion $M_1$. A posture k corresponds to a posture which is a continuation of the posture f in the motion $M_1$ if there is no switching of motions. Furthermore, a posture b corresponds to a posture that is selected as the most similar one to the posture f among the postures in the motion $M_2$ after the switching. Finally, a posture d corresponds to a posture which is a continuation of the posture b in the motion $M_2$ if there is no switching of motions.

A motion of the robot can be expressed as follows:

$$M_{1j} = \sum_{i=0}^{n} \alpha_{ij} p_i \quad (1)$$

$$p_i = k_{p_i}(t - t_{p_i}) \, \delta_{pi} \leq 1 \quad (2)$$

$$M_{2j} = \sum_{i=0}^{z} \beta_{ij} q_i \quad (3)$$

$$q_i = k_{qi}(t - t_{qi}) \, \delta_{qi} \leq 1 \quad (4)$$

where $M_{1j}$ and $M_{2j}$ indicate the movements of a joint j (j=0 to m−1: m is the number of joints) in the motion $M_1$ and the motion $M_2$ respectively, and $\alpha_{ij}$ and $\beta_{ij}$ indicate the angles of the joint j that defines a posture of a frame i (i=0 to n, 0 to z: n and z are the numbers of frames defined in the motion $M_1$ and the motion $M_2$ respectively) in the motion $M_1$ and the motion $M_2$ respectively.

Furthermore, $p_i$ and $q_i$ are the transition patterns defining a transition of postures between the frames in the motion $M_1$ and the motion $M_2$ respectively, and $p_i$ and $q_i$ change from 0 to 1. In the equations (2) and (4), $k_{pi}$ and $k_{qi}$ are positive constants that prescribe the velocity of a posture transition, while $t_{pi}$ and $t_{qi}$ are timings at which the posture transition is started. $\delta_{pi}$ is 1 when $t \geq t_{pi}$, while $\delta_{pi}$ is the zero when time t does not satisfy $t \geq t_{pi}$. Furthermore, $\delta_{qi}$ is 1 when $t \geq t_{qi}$, while $\delta_{qi}$ is zero when time t does not satisfy $t \geq t_{qi}$.

The switching of the motions of the robot can be expressed as follows:

$$M_j = \sum_{i=0}^{f} \alpha_{ij} p_i + (\alpha_{fj} - \beta_{bj}) q_d + \sum_{i=d}^{z} \beta_{ij} q_i \quad (5)$$

$$= \sum_{i=0}^{f} \alpha_{ij} p_i + (\alpha_{fj} + \beta_{dj} - \beta_{bj}) q_d + \sum_{i=d+1}^{z} \beta_{ij} q_i$$

where $M_j$ indicates a movement of the joint j when a motion of the robot is switched. As can be understood from the equation (5), the angle of the joint in a posture d is that obtained by adding angle $\alpha_{fj}$ in a posture f to a difference $\beta_{dj} - \beta_{bj}$ from a posture b to the posture d. As described above, a motion of the robot can be quickly made to be similar to that after the switching, by controlling the posture based on the change in motions after the switching.

A case is assumed here in which the motion of the robot is switched when a posture of the robot is that defined with each frame, however, the timing of switching motions is not limited to this case but can be carried out at any timing.

In such a case, switching of a motion of the robot can be expressed as follows:

$$M_j = \sum_{i=0}^{s} \alpha_{ij} p_i + (\alpha_{sj} - \beta_{bj}) q_d + \sum_{i=d}^{z} \beta_{ij} q_i \quad (6)$$

where s is a posture at a given time point when the robot performs switching of a motion, and $\alpha_{sj}$ is an angle of the joint j at a given time point obtained by a sensor that detects the angle of the joint j.

As described above, motions of the robot are controlled by acquiring information relating to the previously set frames at a plurality of time points after switching motions so that motions of the robot are switched based on the acquired information relating to the frames, thereby an efficient control is possible so that the robot can stably switch the motions.

A case has been assumed above in which the movement of the robot includes movement from one place to another, however, the movement of the robot is not limited to the movement from one place to another. The movement of the robot can include, for example, lifting a load.

FIG. 4 is a schematic of a motion in which the robot lifts up a load. FIG. 4 shows three frames R0, R1, and R2. Each frame defines a posture of the robot in the motion of lifting up a load. Although the movement of lifting a load does not include movement of the robot from one place to another, switching of the motions can be performed by employing the equation (6).

Figure 5:
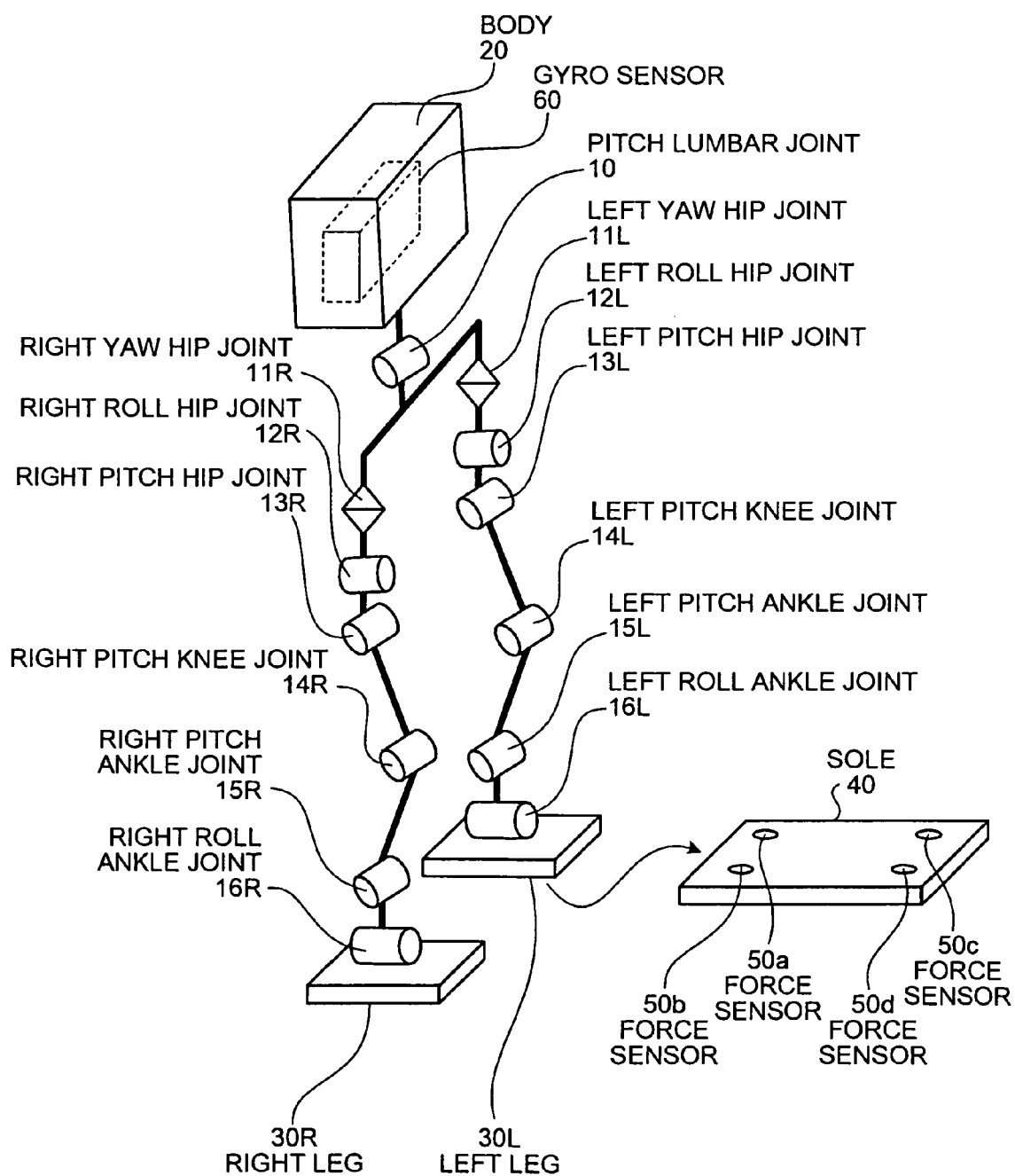
FIG. 5 is a schematic of a robot.

FIG. 5 is a schematic of a robot. The robot includes a body 20, a gyro sensor 60 arranged in the body, and two legs, a right leg 30R and a left leg 30L. Each leg has six joints. Thus, the degree of freedom of each leg is six. However, the number of joints is optional.

The joints include a pitch lumbar joint 10, a right yaw hip joint 11R, a left yaw hip joint 11L, a right roll hip joint 12R, a left roll hip joint 12L, a right pitch hip joint 13R, a left pitch hip joint 13L, a right pitch knee joint 14R, a left pitch knee joint 14L, a right pitch ankle joint 15R, a left pitch ankle joint 15L, a right roll ankle joint 16R, and a left roll ankle joint 16L. A motor (not shown) is incorporated in each joint. The motor of a particular joint controls movements of that joint.

The pitch lumbar joint 10 controls back and forth movements (pitching) of the body 20. Each of the right yaw hip joint 11R and the left yaw hip joint 11L causes clockwise or counterclockwise rotation (yawing) of the robot at upper ends of the corresponding leg.

Each of the right roll hip joint 12R and the left roll hip joint 12L causes sideward rotation (rolling) of the robot at upper ends of the corresponding leg. Each of the right pitch hip joint 13R and the left pitch hip joint 13L causes back and forth rotation (pitching) of the robot at upper ends of the corresponding leg.

Each of the right pitch knee joint 14R and the left pitch knee joint 14L causes back and forth movements (pitching) of the robot at a corresponding knee section. Each of the right pitch ankle joint 15R and the left pitch ankle joint 15L causes back and forth movements (pitching) of the robot at a corresponding ankle section. Each of the right roll ankle joint 16R and the left roll ankle joint 16L causes sideward movements (rolling) of the robot at a corresponding ankle section.

A sole is attached to each leg. FIG. 5 depicts a sole 40 attached to the left leg 30L. Four force sensors are incorporated in each sole. However, the number of the force sensors is optional. FIG. 5 depicts force sensors 50a to 50d attached to the sole 40. The force sensors measure a reaction force which the sole receives from floor surface.

The gyro sensor 60 measures rotational angles of the body 20 in the sideward (rolling) direction and in the back and forth (pitching) direction. The reaction force measured by the force sensors of both legs and the rotational angles measured by the gyro sensor 60 are used to perform feedback control of movements of the robot.

The joints in the lower body of the robot have been considered above, however, robots can have a head and arms. When a robot has a head and two arms, such robots generally have a neck joint, two shoulder joints, two elbow joints, and two wrist joints. The movement of these joints in switching motions can be calculated by employing the equation (6).

Figure 6:
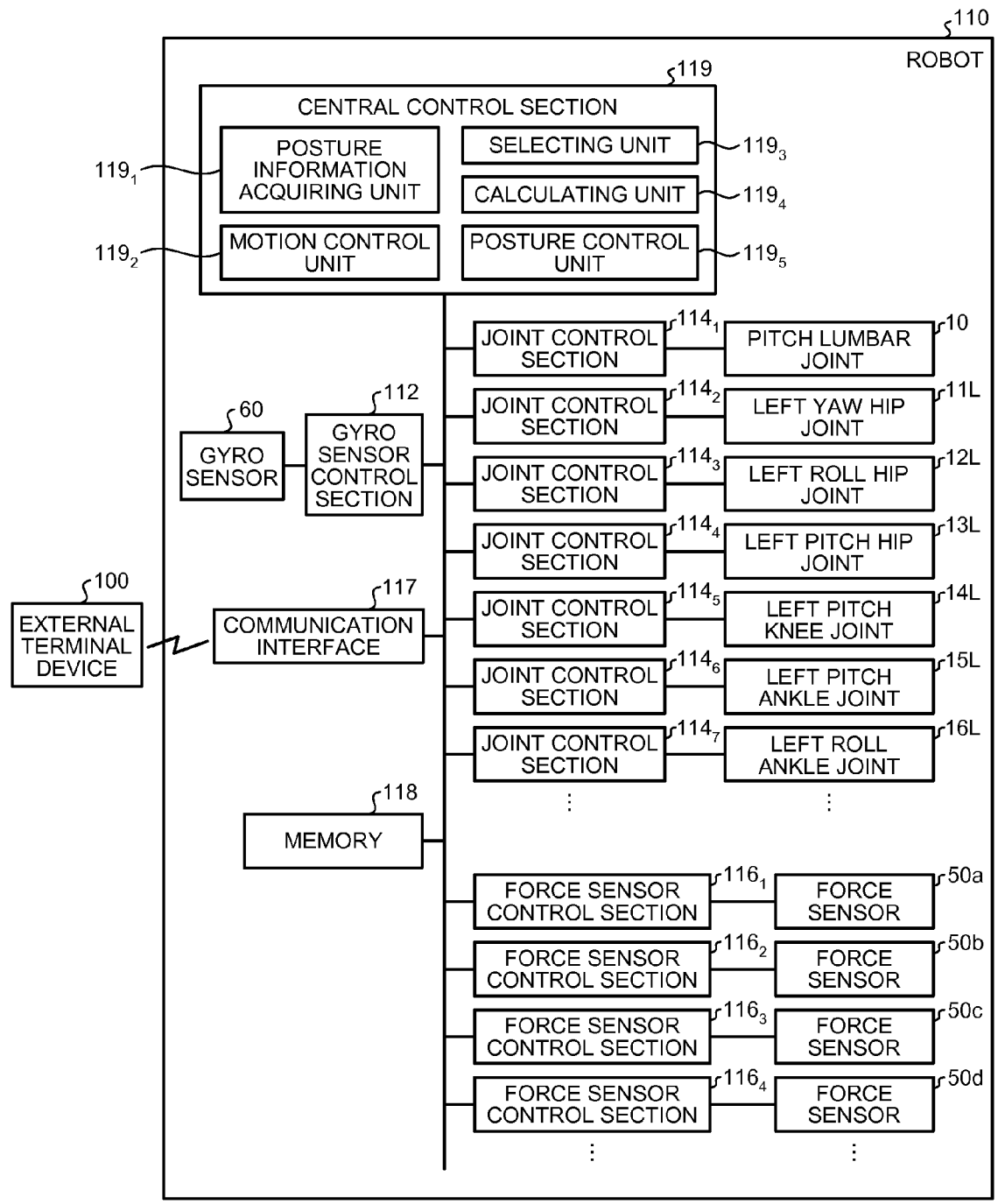
FIG. 6 is a functional block diagram of a robot control system according to an embodiment of the present invention.

FIG. 6 is a functional block diagram of a robot control system according to an embodiment of the present invention. The robot control system includes an external terminal device 100 and a robot 110.

The external terminal device 100 is, for example, a personal computer that is operated by an operator who controls the movement of the robot. The external terminal device 100 and the robot 110 can communicate with each other. The communication includes transmission and reception of various types of information.

The external terminal device 100 transmits information concerning frames and/or command information to the robot 110, or receives information relating to states (posture, velocity, and the like) of the robot 110 from the robot 110. The information obtained from the robot 110 is displayed on a display device (not shown).

The robot 110 is, for example, a two-legged humanoid robot. The robot 110 includes a gyro sensor 60, a gyro sensor control section 112, joints 10, 11L, 12L, 13L, 14L, 15L and 16L, joint control sections $114_1$ to $114_7$, force sensors 50a, 50b, 50c and 50d, force sensor control sections $116_1$ to $116_4$, a communication interface 117, a memory 118, and a central control section 119.

The gyro sensor 60 has the same functions as the gyro sensor 60 shown in FIG. 5. The gyro sensor 60 is provided inside the body 20 of the robot 110, and measures rotational angles in the sideward (rolling) direction and in the back and forth (pitching) direction of the body 20. The gyro sensor control section 112 controls functions of the gyro sensor 60 and transmits information indicative of the rotational angles measured by the gyro sensor 60 to the central control section 119. The gyro sensor 60 corresponds to the gyro sensor 60 shown in FIG. 5.

The gyro sensor control section 112 controls functions of the gyro sensor 60 and also sends information on a rotational angle measured by the gyro sensor 60 to the central control section 119.

The joints 10 to 16L move various joints of the robot 110. Motors (not shown) drive those joints. The joints include the pitch lumbar joint 10, the right yaw hip joint 11R, the left yaw hip joint 11L, the right roll hip joint 12R, the left roll hip joint 12L, the right pitch hip joint 13R, the left pitch hip joint 13L, the right pitch knee joint 14R, the left pitch knee joint 14L, the right pitch ankle joint 15R, the left pitch ankle joint 15L, the right roll ankle joint 16R, and the left roll ankle joint 16L explained in relation to FIG. 5.

The joint control sections $114_1$ to $114_7$ control motions of the joints 10 to 16L. Specifically, the joint control sections $114_1$ to $114_7$ provide a control so that the joints 10 to 16L rotate to prespecified angles at prespecified angular velocities in prespecified times. The angles, the angular velocities, and the times are specified by the central control section 119.

The force sensors 50$a$, 50$b$, 50$c$ and 50$d$ are provided on soles of the right leg and the left legs of the robot 110. The force sensors 50$a$, 50$b$, 50$c$ and 50$d$ measure reaction forces from floor surface. The force sensors 50$a$, 50$b$, 50$c$ and 50$d$ perform the same functions as the force sensors 50$a$ to 50$d$ described in relation to FIG. 5. The force sensor control sections 116$_1$ to 116$_4$ control functions of the force sensors 50$a$, 50$b$, 50$c$ and 50$d$ and transmit information indicative of the reaction forces measured by the force sensors 50$a$, 50$b$, 50$c$ and 50$d$ to the central control section 119.

The communication interface 117 is used to perform communications with the external terminal device 100. The communication interface 117 can perform wireless and/or wired communications with the external terminal device 100.

The memory 118 stores therein various types of information. The memory 118 stores therein, for example, the information received from the external terminal device 100 and/or information to be sent to the external terminal device 100, and also stores therein information relating to results of various operations executed by the central control section 119.

The central control section 119 controls the robot 110 as a whole. The central control section 119, for example, calculates a time point for start of rotation, an angular velocity, a rotational angle and the like for each of the joints 10 to 16L when the robot 110 moves based on the frame information received from the external terminal device 100, and transmits the results to the joint control sections 114$_1$ to 114$_7$.

The central control section 119 also receives a request for changing the current motion of the robot 110 to another from the external terminal device 100 via the communication interface 117. When the central control section 119 receives such a request, the central control section 119 calculates target angle after the change in motion of each joint by employing the equation (6), and sends the calculated angles to the joint control sections 114$_1$ to 114$_7$.

Although it has been explained above that the central control section 119 calculates the angles, it is possible to employ a configuration in which the external terminal unit 100 calculates the parameters and sends them to the robot 110. When such a configuration is adopted, the external terminal unit 100 receives information on the angles of the joints 10 to 16L, and the like of the robot at the current time point, which is required for calculating the angles of the joints 10 to 16L and calculates the angles. Then the external terminal unit 100 sends the results of the calculation to the joint control sections 114$_1$ to 114$_7$ which then control the joints 10 to 16L based on the received results.

The robot control processing performed by the central control section 119 is described in detail below. The robot control processing includes controlling transition of postures among the frames by using a basic recurrent neural network circuit. The basic recurrent neural network circuit used here indicates an RNN circuit for expressing transitions of postures among the frames.

Figure 7:
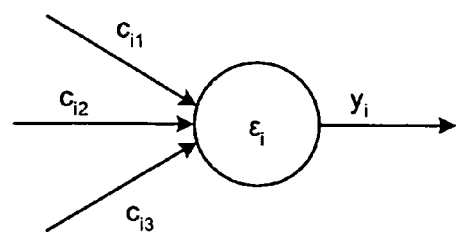
FIG. 7 is a schematic for explaining the mathematical expression model for a neuron.

At first, a model of a mathematical equation for a neuron is described below. FIG. 7 is a schematic for explaining the mathematical expression model for a neuron. The neuron model shown in FIG. 7 can be expressed with a first order differential equation (7):

$$\varepsilon_i \frac{dy_i}{dt} + y_i = \sum_j c_{ij} y_j \quad (7)$$

where $y_i$ is an output from an neuron i, $\varepsilon_i$ is a time delay constant, and $y_j$ is an output from a neuron j inputted with a weighting coefficient $C_{ij}$. The time delay constant is equivalent to a time constant expressing a delay of response to a step input.

Figure 8:
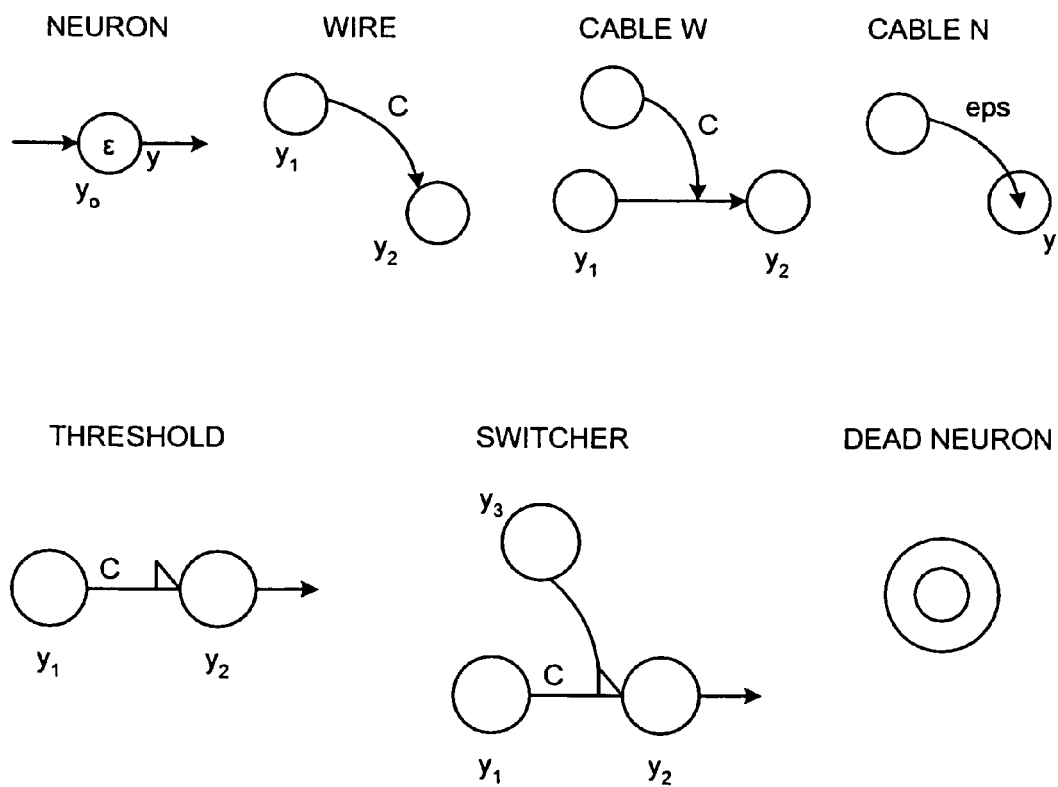
FIG. 8 is a schematic for explaining definitions of the components of the basic RNN circuit.

FIG. 8 is a schematic for explaining definitions of the components of the basic RNN circuit. The basic RNN circuit includes, as main components, a neuron, a wire, a cable W, a cable N, a threshold, a switcher, and a dead neuron.

A neuron with the time delay constant of $\epsilon$ and initial value of $y_0$ is defined as follows:

Neuron: $var\ y(\epsilon) = y_0$ where var is the definition of the cable W, the cable N, and the other components.

The wire is used for connecting two neurons with a prespecified weighting coefficient. For instance, connection between a neuron with the output of Y1 and a neuron with the output of $y_2$ is expressed as follows:

Wire: $y_2 = C^* y_1$.

The cable W is used for changing a weighting coefficient of the wire. The cable W with the time delay constant of $\epsilon$ and initial value of $V_0$ is defined as follows:

Cable $W$: $var\ C(\epsilon) = V_0$.

Wire: $y_2 = C^* y_1$.

The cable N is used for changing time delay constants for other neurons. The cable N with the time delay constant of $\epsilon$ and initial value of $V_0$ for changing a time delay constant of a neuron with the time delay constant of eps and initial value of $W_0$ is defined as follows:

Cable $N$: $var\ eps(\epsilon) = V_0$.

Neuron: $var\ y(eps) = W_0$.

The Threshold is used for receiving output $y_1$ from a certain neuron as an input value when output $y_1$ is larger or smaller than a prespecified value x. Namely, the threshold can be expressed as follows:

Threshold: $y_2$: $= C^*(x >) y_1$, or

Threshold: $y_2$: $= C^*(x <) y_1$.

For instance, when x=1,

Threshold: $y_2$: $= C^*(1 >) y_1$, or

Threshold: $y_2$: $= C^*(1 <) y_1$.

The switcher is used for receiving the value $y_1$ output from another neuron as an inputted value, when $y_3$ output from a certain neuron is larger or smaller than a prespecified value x. Namely, the switcher can be expressed as follows:

Switcher: $y_2$: $= if(y_3 > x) C^* y_1$, or

Switcher: $y_2$: $= if(y_3 < x) C^* y_1$,

For instance, when x=1,

Switcher: $y_2$: $= if(y_3 > 1) C^* y_1$, or

Switcher: $y_2$: $= if(y_3 < 1) C^* y_1$.

The threshold can be regarded as a kind of switcher. The dead neuron is a neuron having a time delay constant of 0.

Figure 9:
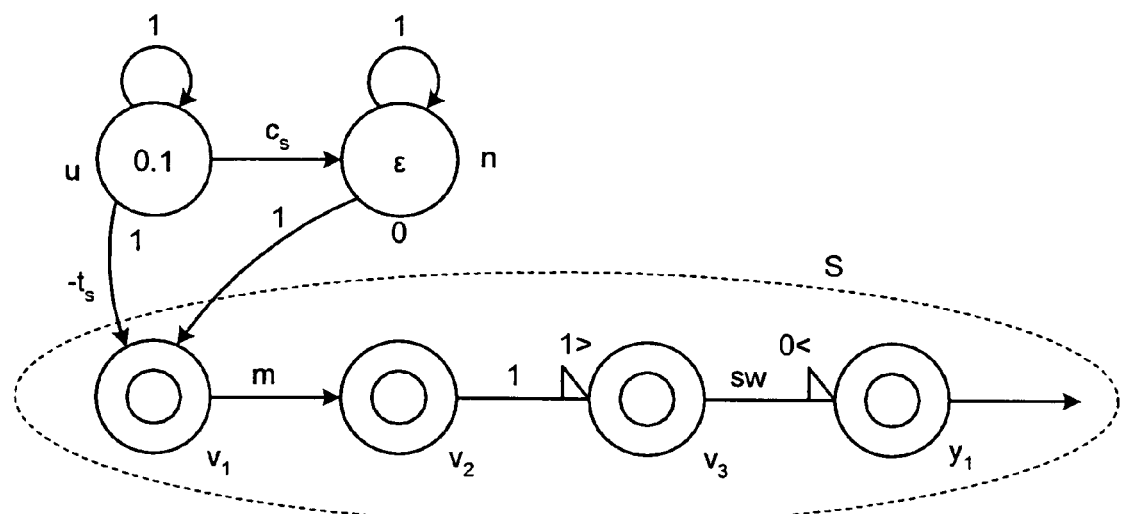
FIG. 9 is a schematic of the basic RNN circuit.

FIG. 9 is a schematic of the basic RNN circuit. The basic RNN circuit includes two neurons u and n, and a sub circuit S. The neuron u generates a unit constant. In the meantime, the neuron n generates a first order polynomial, when an output of the neuron u is inputted into the neuron n via a wire of the weighting coefficient $c_s$.

The time delay constant of any neuron belonging to the sub circuit S is null. Further, the parameter sw is used for switching on or off an operation generated by the basic RNN circuit.

Figure 10:
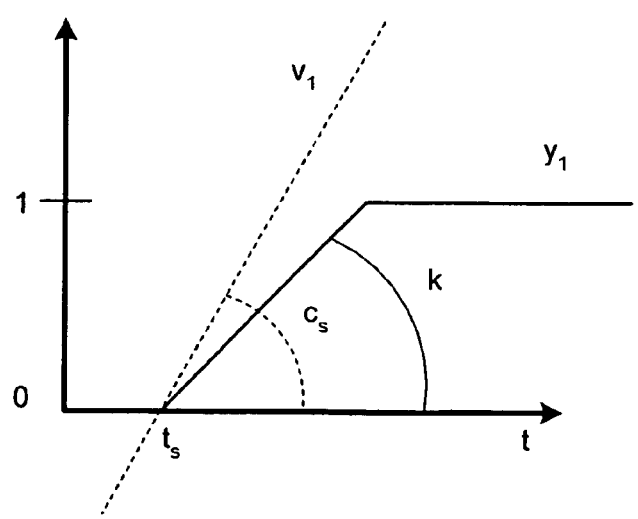
FIG. 10 is a schematic for explaining the output of the basic RNN circuit shown in FIG. 9.

FIG. 10 is a schematic for explaining the output of the basic RNN circuit shown in FIG. 9. FIG. 10 is a view illustrating a rotation at one degree starting at a prespecified angular velocity of $k=c_s m$ at time point $t_S$. In the present invention, though a plurality of frames are set, an operation shifting from a frame to the next frame is started at time point $t_S$.

Further, when the time delay constant $\epsilon$ is 1, the output $v_1$ can be expressed as follows:

$$v1 = c_S t - t_S.$$

Shift in a posture between frames is determined by two parameters, namely, the start time point $t_S$ and an angular velocity k of a joint. Rotation of each joint is realized taking into consideration a basic movement and amplitude starting at the angular velocity k at the start time of $t_S$.

The motion of a joint $J_i$, when a posture of a robot shifts from i-th frame to i+1-st frame, can be expressed as follows:

$$J_i = \sum_{i=0}^{n} c_i y_i, \tag{8}$$

$$y_i = k_i(t - t_i)\delta_i \leq 1, \tag{9}$$

where $c_i$ is an angle, $k_i$ is an angular velocity, and $k_i = c_s m_i \geq 0$. $m_i$ is a parameter that determines the velocity of a joint motion from time point $t_i$ to time point $t_i$ to time point $t_{i+1}$. The value of $m_i$ is determined by trial and error. Moreover, $\delta_i$ is 1 when $t \geq t_i$, while in turn, $\delta_i$ is null when t does not satisfy $t \geq t_i$.

Vibrations are generated when the robot 110 makes any movement. Such vibrations can make the robot 110 unstable. One approach to minimize the vibrations is to provide feedback control based on the angular velocity measured by the gyro sensor 60.

Another feedback control is provided to keep the body 20 upright to a floor surface using a reaction force measured with the force sensors 50a 50b, 50c and 50d. Thus, a roughly set walking pattern of the robot 110 as shown in FIG. 1 is corrected to achieve smooth and stable walk.

Figure 11:
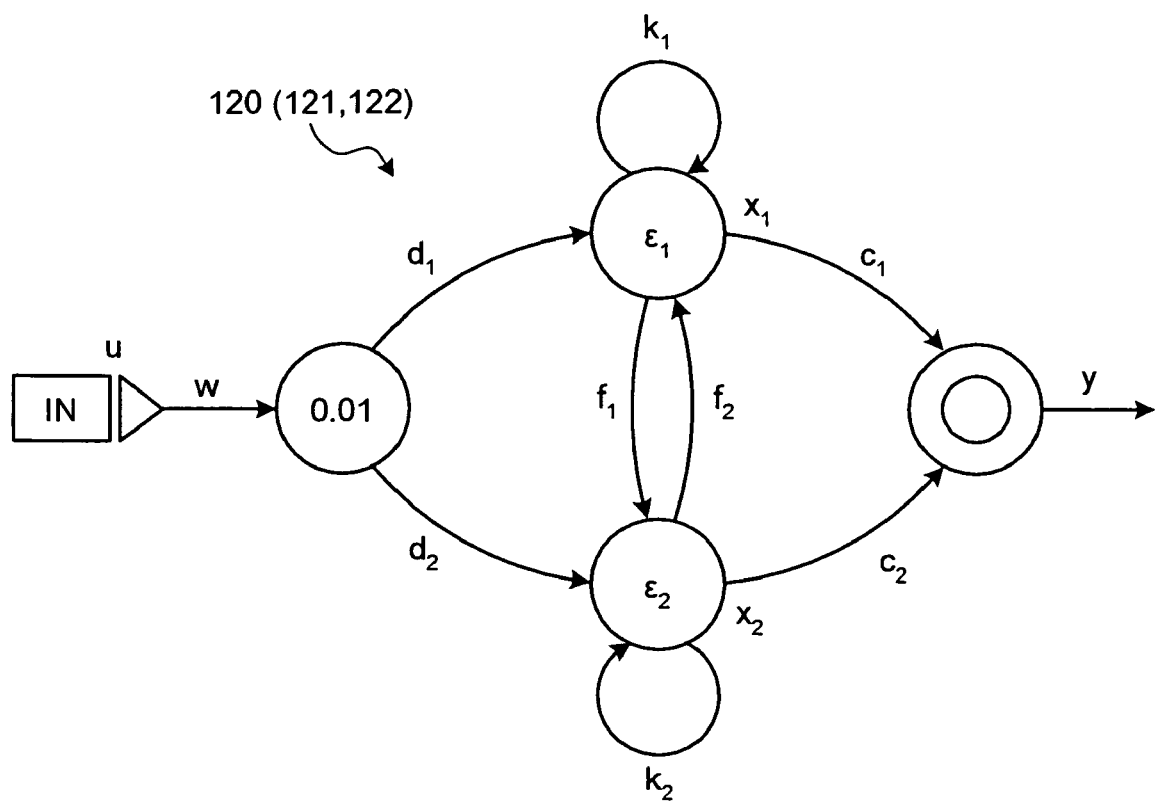
FIG. 11 is a schematic of a controller that receives an input from a gyro sensor or force sensors shown in FIG. 5.

FIG. 11 is a schematic of a controller that receives an input from the gyro sensor 60 or the force sensors 50a, 50b, 50c and 50d. The controller 120 is a quadratic one, and the state space representation thereof is generally expressed as follows:

$$\frac{dx}{dt} = Ax + Bu, \tag{10}$$

$$y = Cx, \tag{11}$$

where x is a state vector, u is an input vector, y is an output vector, A is a system matrix, B is an input matrix, and C is an output matrix. The quadratic controller is only an example; a controller of other orders can be used. The controllers 121 and 122 described later have the same configuration as the controller 120.

The equation (10) can be expressed as follows:

$$\frac{dx_i}{dt} = \sum_{j=1}^{n} a_{ij} x_j + b_i u \tag{12}$$

Further, this equation can be rewritten as follows:

$$\frac{\delta_i}{a_{ii}} \frac{dx_i}{dt} + x_i = (1 + \delta_i) x_i + \sum_{j=1, j \neq i}^{n} \frac{\delta_i a_{ij}}{a_{ii}} x_j + \frac{\delta_i b_i}{a_{ii}} u \tag{13}$$

where $\delta_i = \text{sign}(a_{ii})$. The left side of the equation (13) represents an output from a neuron, while the right side represents an input into a neuron.

FIG. 11 depicts an RNN circuit when n is 2, where $k_i = 1 + \delta_i$, $\epsilon_i = \delta_i / a_{ii}$, $d_i = \delta_i b_i / a_{ii}$, $f_i = \delta_i a_{ij} / a_{ii}$ ($i \neq j$).

Each of the parameters in the controller 120 is adjusted to an appropriate value through the learning process or trial and error. Finally, when feedback is received from the controller 120, the control parameter of a joint can be expressed, from the equations (8) and (11), as follows:

$$J_i = Cx + \sum_{i=0}^{n} c_i y_i \tag{14}$$

Figure 12:
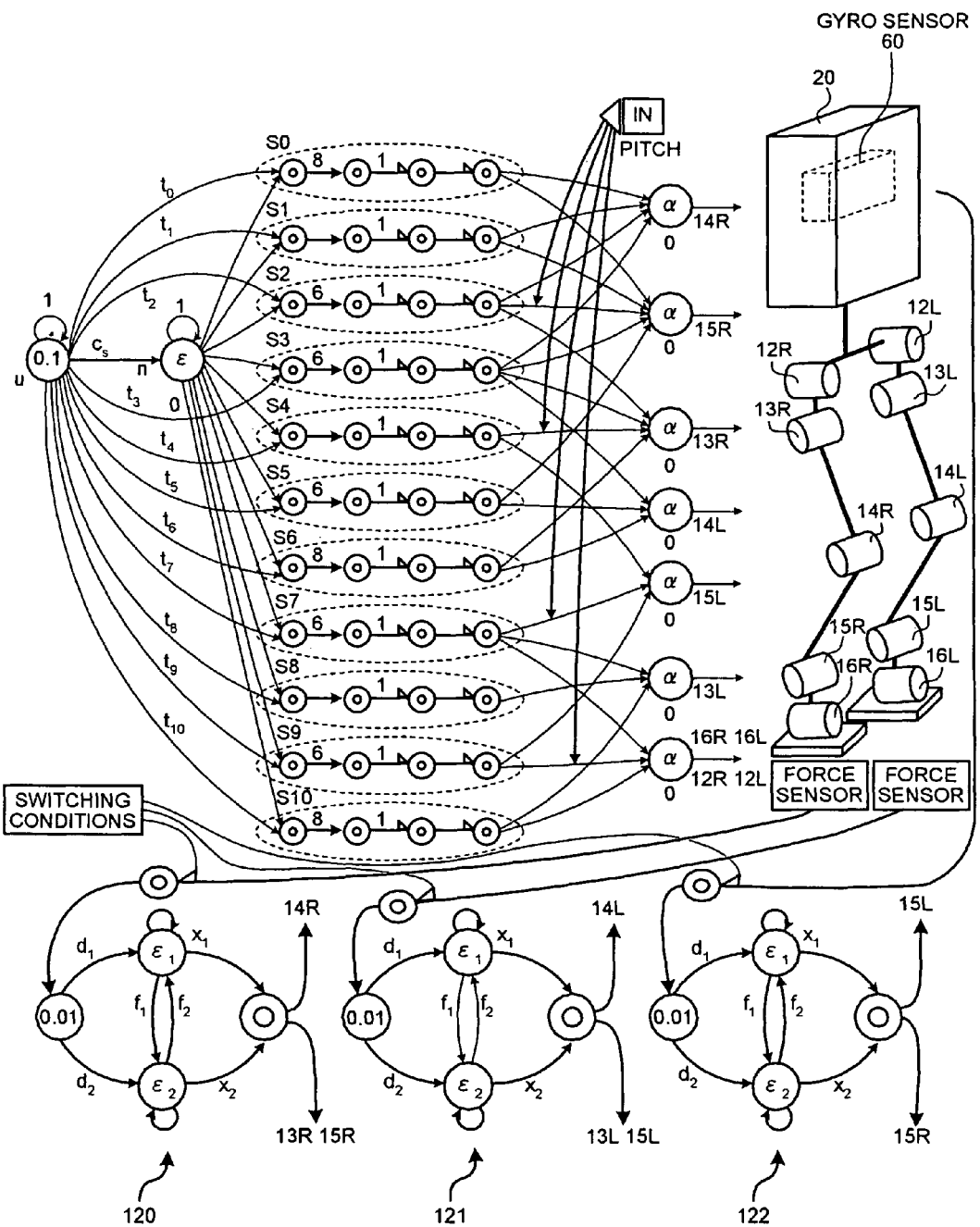
FIG. 12 is a schematic of a neural network for realizing walking of the robot based on a feedback from the gyro sensor and the force sensors.

FIG. 12 is a schematic of a neural network for realizing walking of the robot 110 based on feedback from the gyro sensor 60 and the force sensors 50a, 50b, 50c and 50d. The neural network shown in FIG. 12 includes the controllers 120, 121, 122 shown in FIG. 11.

A schematic diagram of the robot 110 shown in FIG. 12 includes the gyro sensor 60 shown in FIG. 5, the joints 12R to 16R, 12L to 16L, and force sensors (the right force sensor and the left force sensor) provided on the soles of the right leg 30R and the left leg 30L.

The controller shown in FIG. 11 receives an input from the various sensors described above. As shown in FIG. 12, for example, the controller 120 receives an input from the force sensors provided on the sole of the right leg 30R, and generates control parameters for each of the right pitch hip joint 13R, the right pitch knee joint 14R, and the right pitch ankle joint 15R. The controller 121 also receives an input from the force sensors provided on the sole of the left leg 30L, and generates control signals for each of the left pitch hip joint 13L, the left pitch knee joint 14L, and the left pitch ankle joint 15L. The controller 122 also receives an input from the gyro sensor 60, and generates control parameters for each of the right pitch ankle joint 15R and the left pitch ankle joint 15L.

A stride of the robot can be changed by changing a parameter the pitch shown in FIG. 12. More specifically, the parameter pitch changes a stride of the robot by changing the weighting coefficient of a wire using the cable W.

In this neural network, an output to each joint is made to pass through a neuron having the time delay constant of α in order to maintain continuity of each velocity of each joint. The neuron functions as a first-order low pass filter.

FIG. 13 is a schematic for explaining an action of the neuron having a prespecified time delay constant. The time delay constant corresponds to a time constant indicating the extent of a delay of response to a step input. As a result, a rapid change in an angle velocity of each joint can be prevented, and continuity of the angular velocity can be secured by outputting a control parameter to each joint via the neuron having the time delay constant of α.

A case has been explained above in which the neuron constitutes a first-order low pass filter; however, the number of orders of the low pass filter is optional. Furthermore, a case has been explained above in which the time delay constant of each neuron is the same value of α; however, the constant of each neuron may be different from each other. Moreover, the time delay constant of α can be obtained by trial and error.

Next, an adjustment processing of a posture of the robot 110 conducted by the central control section 116 shown in FIG. 6 is explained below. FIG. 14 is a schematic for explaining the adjustment processing when the robot 110 performs a walking motion.

In the adjustment processing, when a motion of the robot 110 is switched from a walking motion to a different motion or from a different motion to a walking motion, the robot is made to walk with various strides for adjusting parameters, so that a posture of the robot 110 can be stably controlled even when the stride of the robot 110 is different.

Precisely, the parameters are adjusted while increasing the stride of the robot 110 step by step by a prespecified value. In the example of FIG. 14, the parameters are adjusted while increasing the stride of the robot 110 by 2 centimeters.

A posture of the robot 110 is defined as the frame $Qi_j$ ($0 \leq i \leq 6$, $0 \leq j \leq 4$) for each stride, where i is the number of a frame defining a posture from the time when the robot 110 walks one step with a prespecified stride until the time when the robot 110 stands motionless with any one of the legs lifted, the leg being different from that having been lifted at the beginning, and j is the number of times of adjusting the parameters by making a stride of the robot 110 longer. In this case, the maximum value of j is four, so that the stride is increased by 8 centimeters.

Figure 15:
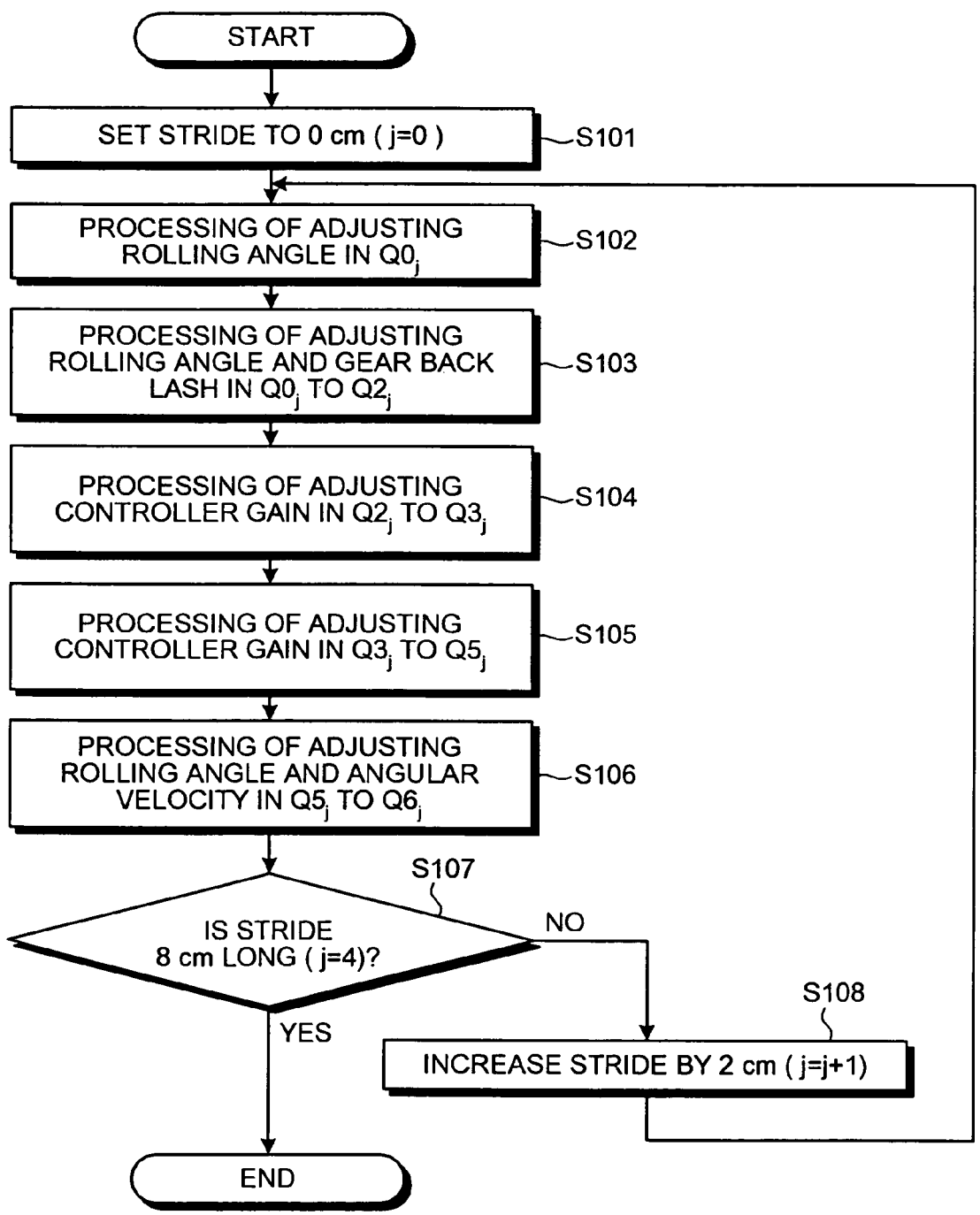
FIG. 15 is a flow chart for explaining a procedure of control processing of a posture of the robot when the robot performs a walking motion.

FIG. 15 is a flow chart for explaining the adjustment processing when the robot 110 performs a walking motion. As shown in FIG. 15, the stride of the robot 110 is at first set to 0 (zero) centimeter (step S101). This state corresponds to the case of j=0 (i.e., $Q0_0$ to $Q6_0$) shown in FIG. 14.

Then, the rolling angle of the body of the robot 110 in the frame $Q0j$ is adjusted (step S102). Namely, the movement of a joint of the robot 110 is expressed as shown in the equation (3), and the rolling angle is adjusted in the frame $Q0_j$ by correcting the movement of a joint as described below:

$$M_{2j} = \sum_{i=0}^{z} \beta_{ij} q_i + \sum_{i=0}^{z} \Delta \beta_{ij} q_i \tag{15}$$

where $\Delta \beta_{ij}$ is an amount of correction for the movement of a joint.

Then, stability of a posture of the robot 110 between the frames $Q0j$ and $Q2j$ is adjusted, and the gear backlash compensation is carried out (step S103). More specifically, the position of barycenter of the force of the robot 110 is computed from the reaction force detected by force sensors provided on the soles of the robot 110, and $\Delta \beta_{ij}$ is adjusted so that the barycenter of the robot 110 is positioned in a range in which the robot 110 can stably stand.

Figure 16:
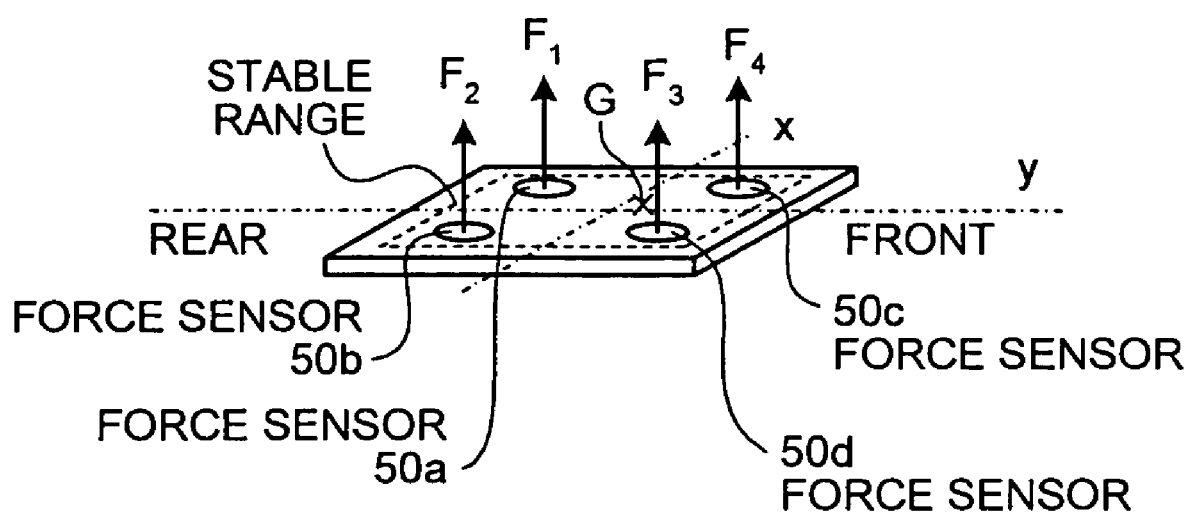
FIG. 16 is a schematic for explaining a posture control provided by using the force sensors shown in FIG. 5.

FIG. 16 is a schematic for explaining a posture control provided by using force sensors 50a to 50d. When the feet of the robot 110 land on a floor surface, as shown in FIG. 16, the reactive force from the floor surface is detected by each of the force sensors 50a to 50d. Then, the position of barycenter ($G_x$, $G_y$) for the detected reactive force is calculated as follows:

$$G_x = \frac{F_2 + F_3}{\sum F_i} - 0.5 \tag{16}$$

$$G_y = \frac{F_3 + F_4}{\sum F_i} - 0.5 \tag{17}$$

Then, $\Delta \beta_{ij}$ is adjusted so that the position of barycenter is constantly in the stable range in which the robot 110 can stably stand.

Further, $\Delta \beta_{ij}$ is adjusted employing the rolling angle detected by the gyro sensor 60. More precisely, $\Delta \beta_{ij}$ is adjusted so that the rolling angle minimizes the performance function as follows:

$$\int_{t_a}^{t_b} (Jyro_y - Jyro_h)^2 dt \tag{18}$$

where $Jyro_y$ is the actual rolling angle, $Jyro_h$ is a rolling angle when the robot 110 stands upright, and $t_a$ and $t_b$ are the prespecified time.

Then, a gain of a controller that controls a movement of the feet of the robot 110 in landing on a floor surface is adjusted between the frame $Q2_j$ and the frame $Q3_j$ (step S104). More specifically, the weight coefficient w is set as the maximum value $w_{max}$ in response to an input from the controllers 20, 21 shown in FIG. 12 in order to softly land the foot, thereby mitigating a shock upon landing in the frame $Q3_j$.

Then, gains of a controller that controls a movement of the leg of the robot 110 in standing on the two legs as well as in lifting one leg are adjusted between the frame $Q3_j$ and the frame $Q5_j$ (step S105). More specifically, the weight coefficient w is reduced to half the maximum value $w_{max}$ so that the foot securely catches the floor surface after landing thereon between the frame $Q3_j$ and the frame $Q4_j$.

When the robot lifts one foot between the frame $Q4_j$ and the frame $Q5_j$, the weight coefficient w is set to its minimum value $w_{min}$ so that the other foot can catch the floor surface further securely. Herein the value of $w_{max}$ and that of $w_{min}$ are determined through trial-and-error so that the body of the robot 110 is positioned upright to the floor surface.

Then, the rolling angle of the body of the robot 110 is adjusted between the frame $Q5_j$ and the frame $Q6_j$, and the angular velocity of each joint of the robot 110 is adjusted so that the robot 110 can stop its movement in a posture of the reference frame $Q6_j$ (step S106)

More specifically, the position of barycenter of the force of the robot 110 is calculated from the reactive force detected by the force sensors 50a to 50d, and $\Delta \beta_{ij}$ in the equation (15) is adjusted so that the barycenter of the robot 110 is positioned in a range in which the robot 110 can stably stand.

Furthermore, $\Delta \beta_{ij}$ is adjusted so that the time average of the rolling angle of the body of the robot 110 is minimized. This adjustment is performed by making use of the rolling angle detected by the gyro sensor 60. The angular velocity of each joint can be adjusted by changing $k_{qi}$ in the equation (4), namely, m in the basic RNN circuit shown in FIG. 9.

Then, it is examined whether the current stride is 8 centimeters long (i.e., whether j=4) (step S107), and, when the current stride is 8 centimeters (step S107, Yes), the adjustment processing for the postures is terminated.

If the current stride is not 8 centimeters (step S107, No), the stride is increased by two centimeters (j=j+1) (step S108), the processing control then shifts to the step S102, and the processing from the step S102 to the step S107 is repeated with the newly set stride.

FIG. 12 shows a neural network that generates a walking motion of the robot 110, however, other neural network that generates other motions can be employed in the same manner. For example, FIG. 17 is a schematic of a neural network that generates a motion of lifting up a load shown in FIG. 4.

In the example shown in FIG. 4, three frames R0, R1, and R2 are set. The neural network shown in FIG. 17 is configured to have two basic RNN circuits in order to interpolate a posture among the three frames R0, R1, and R2.

Figure 17:
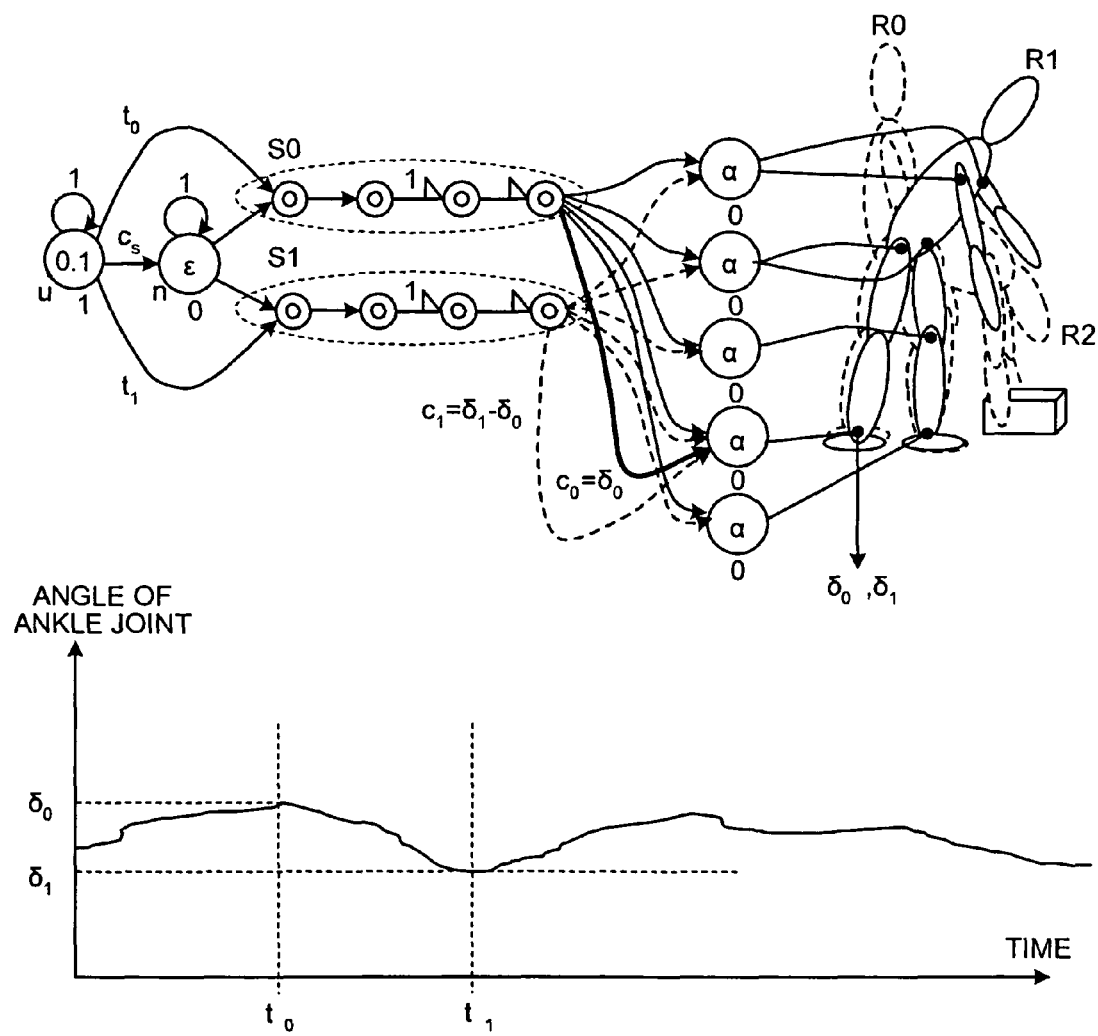
FIG. 17 is a schematic of a neural network that generates a motion of lifting up a load shown in FIG. 4.

Though not shown in FIG. 17, controllers similar to those shown in FIG. 12 are provided. Moreover, a posture of the robot 110 is controlled based on the information on the reaction force obtained by the force sensors 50a to 50d.

Namely, the position of barycenter of the force of the robot 110 is calculated from the reaction force detected by the force sensors 50a to 50d, and $\Delta\beta_{ij}$ in the equation (15) is adjusted so that the barycenter of the robot 110 is positioned in a range in which the robot 110 can stably stand.

FIG. 17 depicts, when the robot 110 performs a motion of lifting up the load, an example of a change in the angle of the right roll ankle joint 16R which is adjusted so that the robot 110 can stably stand.

When the robot 110 again performs the motion of lifting up the load, the motion of the robot 110 is stabilized employing the angle of the joint adjusted according to the first motion without using the information on the reaction force from the force sensors 50a to 50d.

More specifically, coefficients $c_0=\delta_0$ and $c_1=\delta_1-\delta_0$ are calculated from the angles $\delta_0$ and $\delta_1$ of the joint having been adjusted according to the first motion, and the calculated coefficients $c_0$ and $c_1$ are set as weight coefficients of a neural network that generates a movement of the right roll ankle joint 16R.

An example of controlling the right roll ankle joint 16R has been explained above, however, the other joints, such as the left roll ankle joint 16L, the right pitch ankle joint 15R, and the left pitch ankle joint 15L, can be controlled in a similar manner.

An example of adjusting an angle of a joint based on the reaction force detected by the force sensors 50a to 50d in the first motion has been explained above, however, it is possible to employ a configuration in which the angle of a joint is adjusted based on the tilt angle of the body of the robot 110 detected by the gyro sensor 60.

Figure 18:
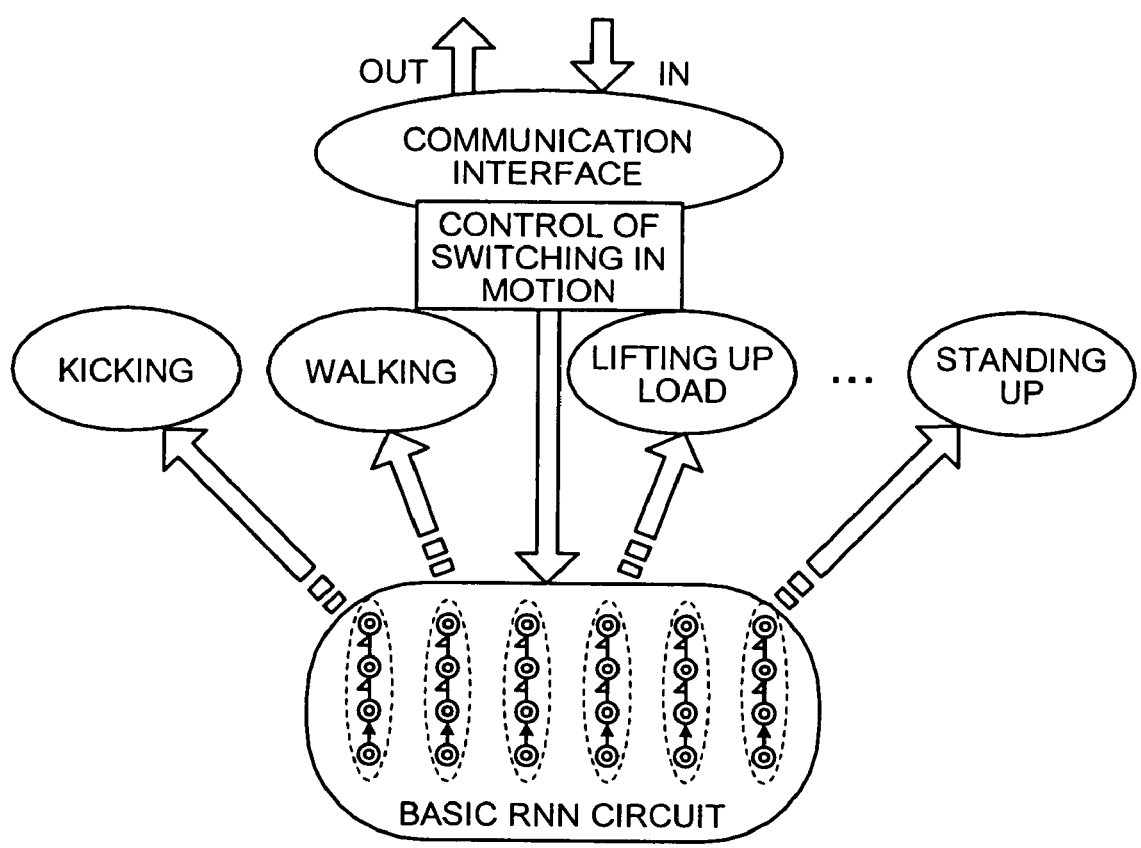
FIG. 18 is a schematic for explaining a neural network that generates various motions of the robot.

Thus, various motions of the robot 110 can be easily generated by using the basic RNN circuit shown in FIG. 9. FIG. 18 is a schematic for explaining a neural network that generates various motions of the robot 110.

As described in FIG. 10, the basic RNN circuit controls a transition in posture between each of the frames. When a request for changing a motion is received from the external terminal device 100 or the like, a basic RNN circuit corresponding to the motion after the switching is selected, and a transition in posture between the frames is controlled by the selected basic RNN circuit.

Figure 19:
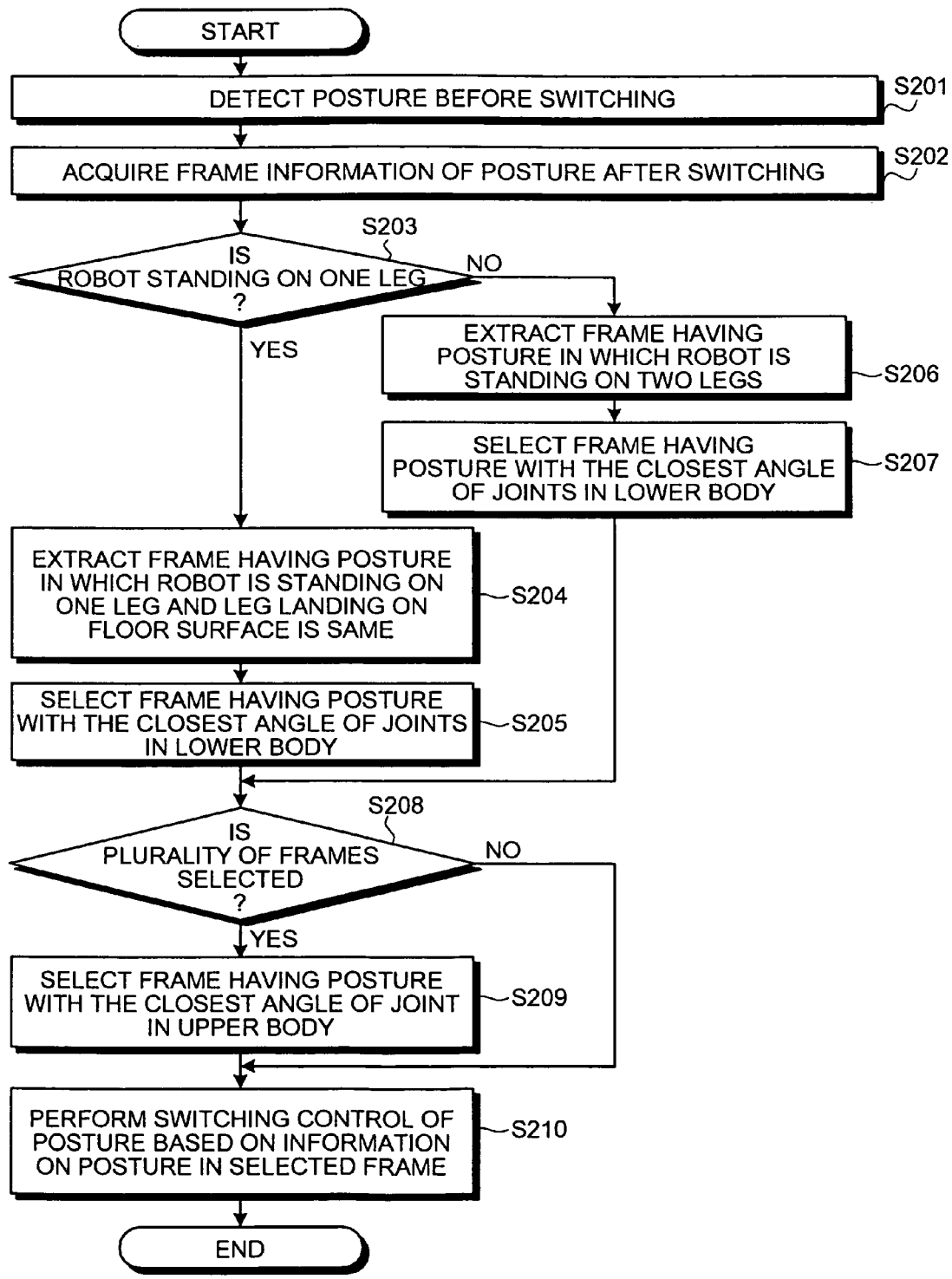
FIG. 19 is a flow chart explaining a procedure of processing of switching motions of the robot.

Next, description is given on a procedure of processing for switching a motion of the robot 110 conducted by the central control section 119 shown in FIG. 6. FIG. 19 is a flow chart of a process procedure for switching operations of the robot 110.

As shown in FIG. 19, when a request for changing a motion is received from the external terminal device 100 or the like, a posture before starting the switching is detected (step S201).

Precisely, information on the angle of each joint is detected by joint control sections $114_1$ to $114_7$, and the detected information is sent to the central control section 119.

Then the frame information on the motion after the switching is acquired from the memory 118 (step S202). Furthermore, it is determined whether the robot 110 is standing on one leg (step S203).

When the robot 110 is standing on one leg (step S203, Yes), the frame in which the robot takes the posture of standing on one leg and in which the leg landing on the floor surface (right leg/left leg) is the same is extracted among the frames of motions after the switching (step S204). If there are a plurality of frames fulfilling these conditions, all of those frames are extracted.

Among the extracted frames, a frame representing a posture having the angle of joints in the lower body closest to that before the switching is selected (step S205). More specifically, joints that exert an influence on the inertia of the robot 110 is selected among the joints shown in FIG. 5, and priorities of the joints is determined according to the magnitude of the influence (for instance, in the order of a hip joint, a knee joint, and an ankle joint).

Then, for the joint having the highest priority, the angles of that joint before and after the switching of motions are compared, and a frame corresponding to a posture having the smallest difference of the angle of the joint is selected. If more than one frames are selected in this process, the joint having the second highest priority is subjected to the comparison of the angles before and after switching of motions, and the frame corresponding to the posture having the smallest difference of the angle of the joint is selected.

If a plurality of frames are selected even for the joint having the second highest priority, the joint having the third highest priority is subjected to the comparison of its angles. This process is repeated until only one frame is selected, or the comparison of the angles is completed for all joints with the priority established thereto.

On the other hand, when the robot 110 is not in a posture of standing on one leg (step S203, No), it means that the robot 110 is standing on the two legs. Therefore, a frame corresponding to a posture of standing on the two legs is extracted among the frames for motions after the switching (step S206). When there are a plurality of frames fulfilling this condition, all the frames that fulfill these conditions are extracted.

Then, as in the case of the posture of standing on one leg, a frame corresponding to a posture having the angle of joints in the lower body closest to that before the switching is selected among the extracted frames (step S207).

With the processing at the step S205 or the step S207, whether more than one frames are extracted is finally determined (step S208). Namely, as a result of setting the priority of joints and comparing angles of each of the joints in the lower body, whether a plurality of frames is selected or not is examined.

When only one frame is selected (step S208, No), switching control of a posture is performed using the equation (6) based on information concerning a posture in the frame (step S210), and this processing of switching of motions is terminated.

When a plurality of frames is selected (step S208 Yes), a frame corresponding to a posture having the angle of a joint in the upper body closest to that before switching is selected among a plurality of frames (step S209).

More specifically, joints that exert an influence on the inertia of the robot 110 is selected among the joints in the upper body of the robot 110, and priorities of the joints is established according to the magnitude of the influence (for instance, in the order of a shoulder joint, an elbow joint, and a wrist joint).

Then, for the joint having the highest priority, the angles of that before and after the switching of motions are compared, and a frame corresponding to a posture having the smallest difference of the angle of the joint is selected. If more than one frames are selected in this process, the joint having the second highest priority is subjected to a comparison of the angles before and after the switching of motions and a frame corresponding to a posture having the smallest difference of the angle of the joint is selected.

If a plurality of frames are selected even for the joint having the second highest priority, the joint having the third highest priority is subjected to the comparison of its angles. This process is repeated until only one frame is selected, or the comparison of the angles is completed for all joints with the priority established thereto. If more than one frames are still selected even after the processing as described above is finished, any one of the frames is selected.

Then, switching control of a posture is provided using the equation (6) based on information concerning a posture in the selected frame (step S210), and this processing of switching of motions is terminated.

As described in FIG. 6, according to the present embodiment, the posture information acquiring unit $119_1$ in the central control section 119 of the robot 110 acquires, when switching motion of the robot 110 from one motion to another, frame information relating to the previously set postures at a plurality of time points after the switching, and the motion control unit $119_2$ switches the motions based on the acquired frame information. As a result, an efficient control is possible so that the robot 110 can stably switch motions by previously setting postures at a plurality of time points after the switching and switching the motions based on the postures.

Moreover, the selection unit $119_3$ in the central control section 119 selects a posture most similar to the posture in a motion before the switching among the previously set postures at a plurality of time points based on the frame information acquired from the memory 118, and switches the motions based on the information relating to the selected posture. As a result, an efficient control is possible so that the robot 110 can mitigate a major change in postures and stably switch motions by switching operations of the robot 110 based on the most similar posture.

Furthermore, the calculating unit $119_4$ in the central control section 119 calculates, by using the equation (6), an amount of correction for correcting the posture of the robot 110 from that before switching based on the difference between posture for a motion after the switching most similar to that before switching and a posture at the time point next to the posture in the motion after the switching, and switches the motions based on the calculated amount of correction. As a result, the motion can be quickly made to be similar to that after the switching, by controlling the posture based on a change in motion after the switching.

Moreover, the posture control unit $119_5$ in the central control section 119 provides controls so that the posture of the robot 110 is shifted to that for suspending a travel without falling and so that switching relating to motions of the robot 110 with a posture controlled is performed. As a result, the robot 110 can stably perform switching of the motions including a movement such as walking without falling.

Furthermore, the posture of the robot 110 for suspending a travel without falling is configured to be a posture in which the two-legged robot 110 stands on only one leg and a stride of the robot 110 is zero, and the central control section 119 switches the motions at the posture when the robot 110 suspends the movement without falling down. As a result, the motions of the robot 110 can be stably switched.

Moreover, the central control section 119 provides controls so that the robot 110, while performing a prespecified motion such as lifting up a load, keeps the state of suspending a movement without falling, and so that switching relating to a motion with the posture controlled therein is performed. As a result, the motions of the robot can be stably switched.

One embodiment of the present invention has been described above, however, the present invention is not limited to the embodiment but can be implemented in various other ways within the range of the technological idea described in the claims.

Among each of the processings described in this embodiment, all or some processings described to be automatically performed can be manually performed, while in turn, all or some processings described to be manually performed can be automatically performed utilizing available methods.

Moreover, the procedure of processing, the procedure of control, specific names, and information including various types of data and parameters provided in the documents and drawings described above can be discretionarily changed unless otherwise noted.

Each component of each device shown in each figure represents a functional concept, and is not necessarily constituted as shown in the figure in terms of a physical meaning. Namely, a specific conformation in distributing and integrating the robot controller is not limited to that shown in the figure, and the robot controller can be constituted by functionally and physically distributing and integrating all or some of the components in a given unit according to various types of loading or the state of use.

All or any part of each processing function performed by the robot controller can be realized by a CPU or by a program which is analyzed and executed in the CPU, or can be realized as hardware by means of a wired logic.

The method of controlling a robot described in this embodiment can be realized by executing a computer program on a computer.

The computer can receive the computer program via a network such as the Internet. Alternatively, the computer can read the computer program from a computer-readable recording medium. The computer-readable recording medium can be a hard disk, a flexible disk (FD), a CD-ROM, an MO, and a DVD.

With the present invention, motions of the robot are controlled by acquiring, when a motion of the robot is switched to another, information relating to previously set postures the robot at a plurality of time points after the switching motions so that motions of the robot are switched based on the acquired information relating to the postures, whereby the advantage is provided that an efficient control is possible so that the robot can stably switch motions while performing a given motion, by previously setting postures at a plurality of time points after the switching and switching the motions based on the postures.

With the present invention, motions of the robot are controlled by selecting the posture most similar to a posture in a motion before switching of motions among the previously set postures at a plurality of time points based on the acquired information relating to postures, so that motions of the robot are switched based on the acquired information relating to the selected posture, whereby the advantage is provided that an efficient control is possible so that the robot can mitigate a major change in postures and stably switch motions, by switching motions of the robot based on the most similar posture.

With the present invention, motions of the robot are controlled based on information computed from an amount of correction for correcting a posture of the robot from that before switching, based on a difference between a posture in the motion after switching most similar to that before switching and a posture at the time point next to the posture of the motion after the switching, so that motions of the robot are switched based on the computed amount of correction, whereby the advantage is provided that a motion can be quickly made to be similar to that after the switching, by controlling a posture of the robot based on a change in motions after the switching.

With the present invention, motions of the robot are controlled so that a posture of the robot is shifted to that for suspending a travel of the robot without falling and so that switching relating to motions of the robot with the posture controlled is performed, whereby the advantage is provided that controls can be provided so that the robot can stably perform a switching relating to the operations including a travel without falling.

With the present invention, a posture of the robot for suspending the travel without falling is that in which the two-legged robot stands on only one leg and the stride is 0, and controls are provided so that motions of the robot are switched to another starting from a posture of suspending the travel without falling, whereby the advantage is provided that a control is possible so that a motion of the robot can stably shift to another motion.

With the present invention, postures of the robot are controlled so that the robot, while performing a prespecified motion, keeps the state of suspending the travel without falling, and controls are provided so that switching relating to a motion of the robot with the posture controlled therein is performed, whereby the advantage is provided that a control is possible so that the robot can stably switch the motions not including a travel without falling.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A robot controller that controls motions of a robot when switching motion of the robot from a first motion that is defined by a first time series of a plurality of first postures, which the robot is currently performing, to a second motion that is defined by a second time series of a plurality of second postures, the robot controller comprising:
    a storage unit that stores second posture information indicative of the second postures of the robot in the second motion at respective time points in the second time series,
    a posture information acquiring unit that acquires the second posture information from the storage unit on receiving an order of switch from the first motion to the second motion;
    a selecting unit that selects a second posture of the robot from the second posture information, the second posture having an angle of joints closest to an angle of joints in a first posture of the robot in the first motion before switching of motions and being different from a subsequent first posture within the first time series of the plurality of first postures in the first motion, and
    a motion control unit that controls switching of the motion of the robot from the first motion to the second motion based on the selected second posture, wherein
    the posture of the robot is defined by angles of joint at a certain point in time.

2. The robot controller according to claim 1, further comprising a calculating unit that calculates an amount of correction for correcting the first posture of the robot in the first motion before switching of motions, based on a difference between the selected second posture and a subsequent second posture within second time series of a plurality of second postures, wherein
    the motion controlling unit controls switching of the motion of the robot based on the amount of correction calculated by the calculating unit.

3. The robot controller according to claim 1, wherein the postures of the robot includes a reference posture in which the robot stands still without falling down, the robot controller further comprises a posture control unit that controls postures of the robot so that the posture of the robot shifts smoothly to the reference posture, and
    the motion controlling unit controls switching of the motions of the robot of which the posture of the robot is being controlled by the posture control unit.

4. The robot controller according to claim 3, wherein, the reference posture is a posture in which a two legged robot stands only on one leg and a stride is zero, and
    the motion controlling unit controls switching of the motions of the two legged robot so that the switching is performed when a posture of the two legged robot is the reference posture.

5. The robot controller according to claim 1, wherein the first motion includes a motion that does not involve movement of the robot from one place to another place,
    The robot controller further comprises a posture control unit that controls a posture of the robot that is performing the first motion without falling down, and
    the motion controlling unit controls switching of the motions of the robot of which the posture of the robot is being controlled by the posture control unit.

6. A method of controlling motions of a robot when switching motion of the robot from a first motion that is defined by first time series of a plurality of first postures, which the robot is currently performing, to a second motion that is defined by a second time series of a plurality of second postures, the method comprising:
    acquiring second posture information from a storage upon receiving an order of switch from the first motion to the second motion;
    selecting a second posture of the robot from the second posture information, the selected second posture having an angle of joints closest to an angle of joints in a first posture of the robot in the first motion before switching of motions and being different from a subsequent first within the first time series of the plurality of first postures in the first motion; and
    controlling switching of the motion of the robot from the first motion to the second motion based on information of the selected second posture, wherein
    the posture of the robot is defined by angles of joint at a certain point in time.

* * * * *